FIG. 1

INVENTORS
ROLAND B. REYNOLDS
DIETRICH RUMPP
BY EMERSON R. TROBAUGH

Bower & Patalidis
ATTORNEYS

FIG.2

Nov. 22, 1966   R. B. REYNOLDS ET AL   3,286,556
BORING HEAD WITH TOOL POSITIONING MEANS
Filed Sept. 14, 1965                                     9 Sheets-Sheet 3

INVENTORS
ROLAND B. REYNOLDS
DIETRICH RUMPP
BY EMERSON R. TROBAUGH

Bower & Patalidis
ATTORNEYS

Nov. 22, 1966     R. B. REYNOLDS ETAL     3,286,556
BORING HEAD WITH TOOL POSITIONING MEANS
Filed Sept. 14, 1965     9 Sheets-Sheet 7

INVENTORS
ROLAND B. REYNOLDS
DIETRICH RUMPP
BY EMERSON R. TROBAUGH

*Bower & Patalidis*
ATTORNEYS

FIG. 12

INVENTORS
ROLAND B. REYNOLDS
DIETRICH RUMPP
BY EMERSON R. TROBAUGH

Bower & Patalidis
ATTORNEYS

Nov. 22, 1966  R. B. REYNOLDS ETAL  3,286,556
BORING HEAD WITH TOOL POSITIONING MEANS
Filed Sept. 14, 1965  9 Sheets-Sheet 9

INVENTORS
ROLAND B. REYNOLDS
DIETRICH RUMPP
BY EMERSON R. TROBAUGH

Bower & Patalidis
ATTORNEYS

United States Patent Office 3,286,556
Patented Nov. 22, 1966

3,286,556
BORING HEAD WITH TOOL POSITIONING MEANS
Roland B. Reynolds, Birmingham, Dietrich Rumpp, Detroit, and Emerson R. Trobaugh, Farmington, Mich., assignors to Ex-Cell-O Corporation, Detroit, Mich.
Filed Sept. 14, 1965, Ser. No. 487,120
20 Claims. (Cl. 77—57)

This invention relates generally to boring heads for machine tools, and more particularly to an improved boring head provided with a novel tool positioning means.

It is an object of the present invention to provide an improved boring head which includes means for radially adjusting the tool carried on the boring head while the boring head spindle is rotating, in order to produce different bore diameters on the workpiece without the necessity of interrupting the spindle rotation and to increase the bore accuracy and avoid the need for a plurality of cutting tools. Boring heads of this type are well known in the art. For example, the United States patent to E. Carlson et al., No. 3,169,416 discloses a boring head provided with a mechanism for adjusting a tool slide assembly during rotation of the spindle. The mechanism employed by the boring head disclosed in said patent includes a radially disposed lead screw connected to the tool slide assembly for adjusting the same. The lead screw is rotated by a drive shaft coaxial with the boring head spindle and a bevel gearing structure. A disadvantage of the mechanism disclosed in said patent is that the centrifugal forces acting on the boring head during a machining operation exert a static friction on the radially disposed lead screw and additional driving torque must be provided to overcome such static friction. Another disadvantage is that the accuracy of the boring head is affected by the axial thrust variations on the lead screw. Other prior art boring heads have similar disadvantages due to their particular construction.

In view of the foregoing, it is an important object of the present invention to provide a novel and improved boring head which overcomes the aforementioned disadvantages of the prior art boring heads.

It is another object of the present invention to provide a novel and improved boring head which includes a mechanical means for radially adjusting a tool carried on the boring head while the boring head is rotating, and which can be arranged to operate at various required spindle speeds and tool weights.

It is a further object of the present invention to provide a novel and improved boring head which includes a hydraulic means for radially adjusting a tool carried on the boring head while the boring head is rotating, and which can be arranged to operate at various spindle speeds and tool weights.

It is still another object of the present invention to provide a novel and improved boring head which includes a positioning power drive means for actuating a draw bar means that is adapted to operate either a mechanical means or a hydraulic means for radially adjusting a tool carried on the boring head while the boring head is rotating.

It is still a further object of the present invention to provide a novel and improved boring head which is compact in construction, economical to manufacture and efficient in operation.

It is another object of the present invention to provide a novel and improved boring head which includes a draw bar construction which is adapted to be operated by a positioning power drive means that is controlled by a tape control means or the like, and which draw bar means actuates a plurality of hydraulic cylinders for simultaneously adjusting a counterweight assembly in one direction and a tool slide assembly in another direction.

It is still another object of the present invention to provide a novel and improved boring head which includes a draw bar construction which is adapted to be operated by a positioning power drive means that is controlled by a tape control means or the like, and which draw bar means actuates a combined bell-crank lever and cam means for simultaneously adjusting a counterweight assembly in one direction and a tool slide assembly in another direction.

It is a further object of the present invention to provide a novel and improved boring head which includes a rotatably mounted spindle, a housing secured to said rotatable spindle, a tool slide assembly moveably mounted on said housing for adjustment perpendicular to the longitudinal axis of said spindle and having a cutting tool operatively mounted thereon, a counterweight assembly movably mounted on said housing for adjustment perpendicular to the longitudinal axis of said spindle with the total weight of said tool slide assembly being equal to the total weight of said counterweight assembly, adjustment means for simultaneously moving said tool slide assembly and said counterweight assembly in opposite directions perpendicular to the axis of said spindle, and means for actuating said adjustment means.

Other objects, features and advantages of this invention will be apparent from the following detailed description, appended claims, and the accompanying drawings.

Figure 1:
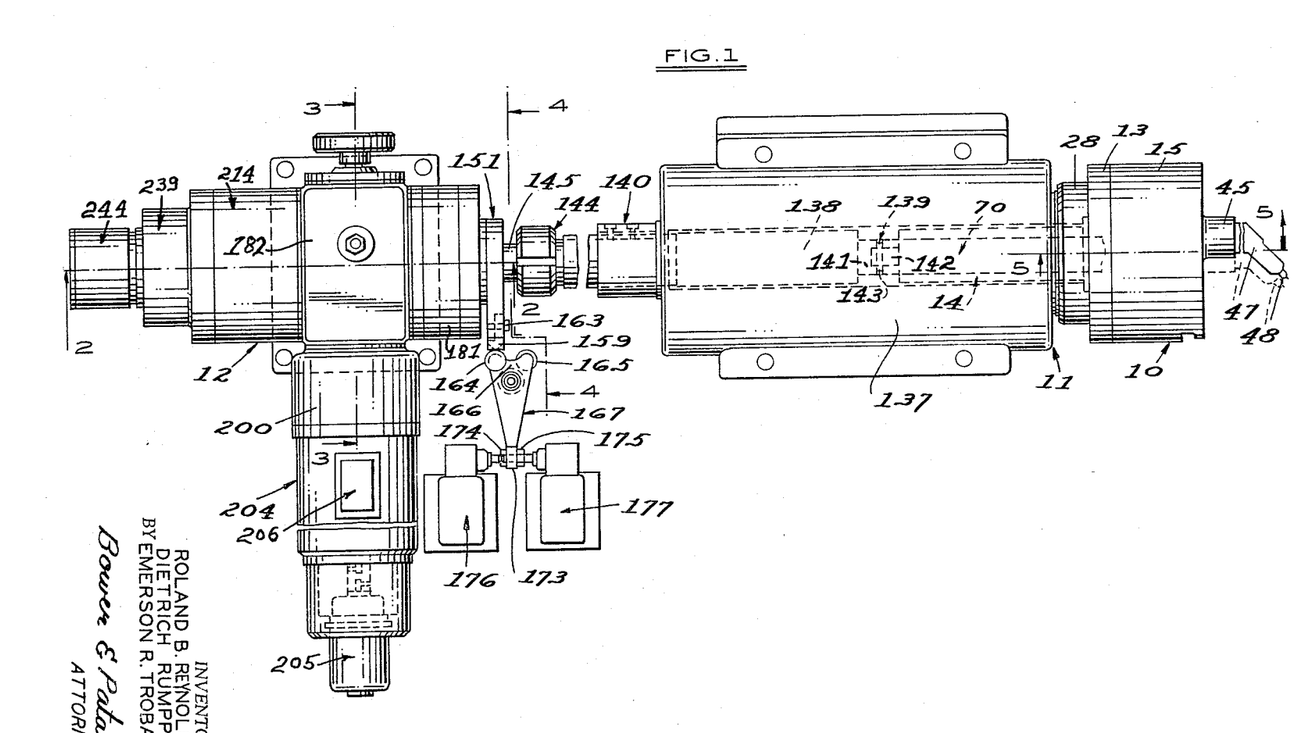
FIG. 1 is a broken, plan view of a boring head and control means made in accordance with the principles of the present invention.

Referring now to the drawings, and in particular to FIG. 1, the numeral 10 generally indicates a boring head made in accordance with the principles of the present invention. The boring head 10 is operatively secured to one end of a boring machine spindle, generally indicated by the numeral 11. The reference numeral 12 generally indicates a drive means for positioning a tool slide assembly 34 which is slidably mounted on the boring head 10, as more fully described hereinafter. The boring head 10 of the present invention is adapted to be used on multi-axis tape controlled machines.

Figure 5:
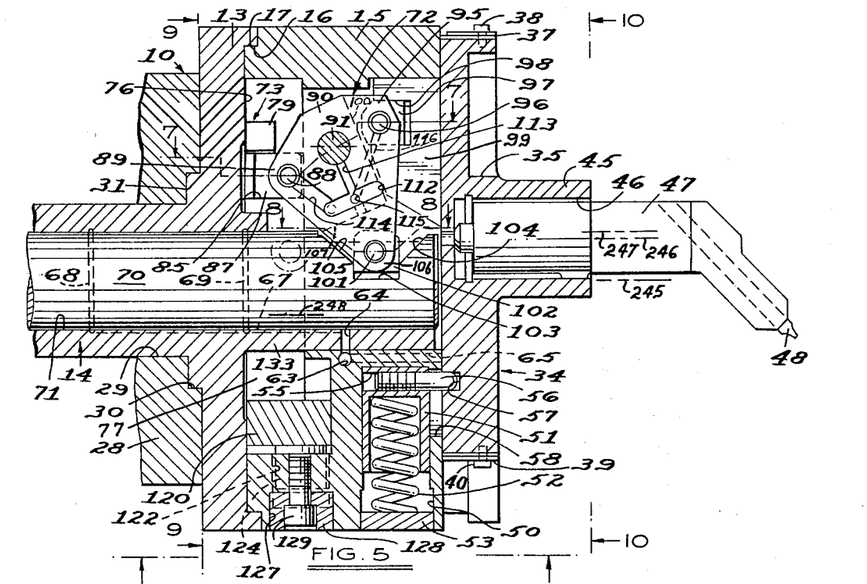
FIG. 5 is a fragmentary, elevational section view of the structure illustrated in FIG. 1, and taken along the line 5—5 thereof.
Figure 9:
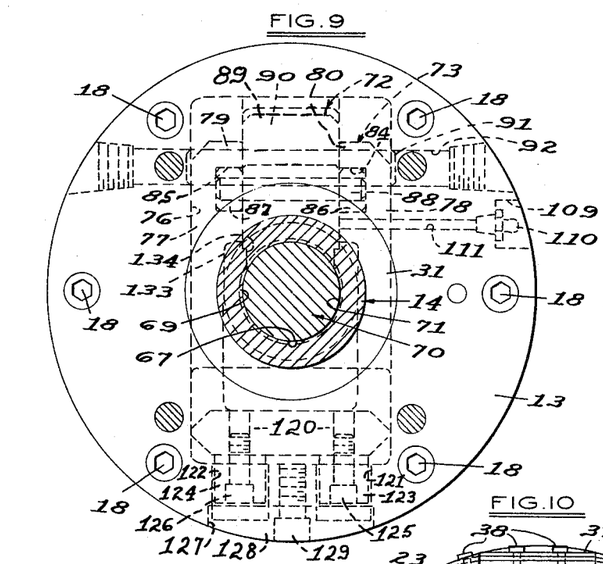
FIG. 9 is an elevational section view of the structure illustrated in FIG. 5, taken substantially along the line 9—9 thereof, and looking in the direction of the arrows.

As shown in FIG. 5, the boring head 10 includes a mechanical means for actuating the tool slide assembly 34 and comprises an annular mounting plate 13 which is provided with the rearwardly extended integral hollow shaft 14. The boring head 10 further includes the annular or circular housing 15 which is provided on the rear end thereof with a reduced portion 17 adapted to be seated in the annular recess 16 formed on the front side of the plate 13. As shown in FIG. 9, the plate 13 is secured to the housing 15 by a plurality of screws 18.

Figure 6:
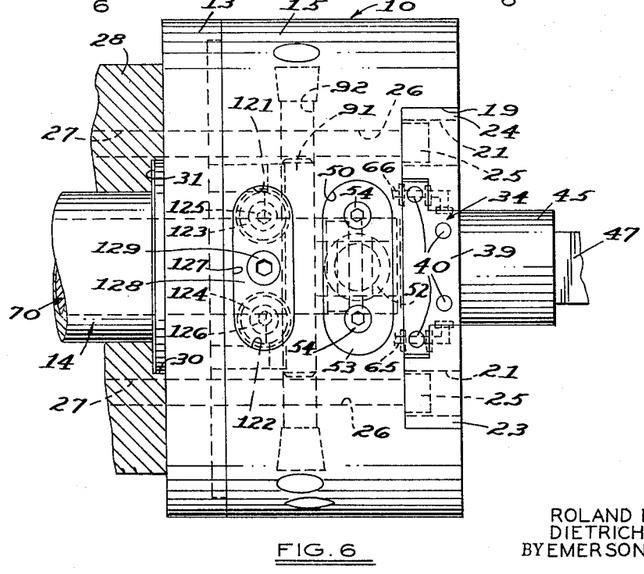
FIG. 6 is a bottom plan view of the structure illustrated in FIG. 5, taken along the line 6—6 thereof, and looking in the direction of the arrows.
Figure 10:
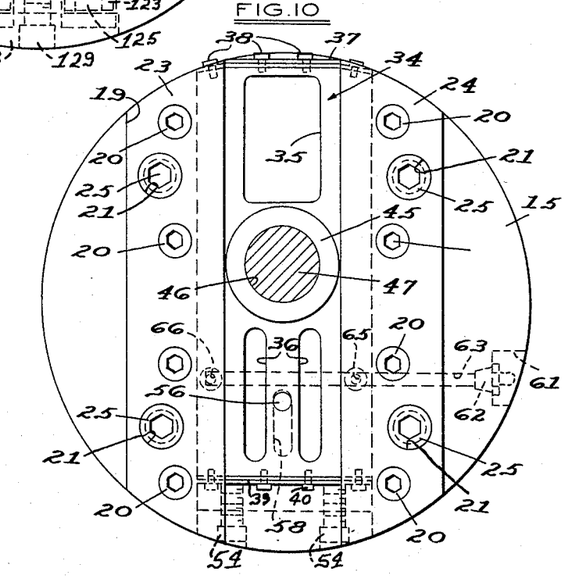
FIG. 10 is a front end elevational view of the boring head structure illustrated in FIG. 5, taken along the line 10—10 thereof, and looking in the direction of the arrows.

As shown in FIGS. 6 and 10, a central, square way or recess 19 is formed in the front flat surface of the housing 15. A pair of tool slide retaining guide members 23 and 24 are disposed in spaced, parallel relation in the recess 19 and are secured in place by a plurality of screws 20. A tool slide assembly, generally indicated by the numeral 34, is slidably mounted in the recess 19 between the retaining guide members 23 and 24. The tool slide assembly 34 rests on the bottom surface of the recess 19 and is retained by inwardly projecting guide portions on the retaining guide members 23 and 24 which overlap laterally outward projecting tool slide portions along the sides of the tool slide assembly 34.

As shown in FIGS. 6 and 10, the retaining guide members 23 and 24 are provided with a plurality of holes 21 formed therethrough through each of which is mounted an elongated screw 25 which passes through a hole 26 formed through the casing 15 and which threadably engages a threaded hole 27 formed in the boring head rear housing portion 28. The housing portion 28 is provided with an axial bore 29 through which is extended the hollow shaft 14. As shown in FIG. 6, the housing portion 28 is provided with an annular recess 30 on the front side thereof in which is seated the annular projection 31 formed on the rear face of the plate 13.

As shown in FIG. 10, the tool slide assembly 34 is of an elongated shape and is provided on one end thereof with the milled out recess 35 and on the other end with the laterally spaced apart milled out slots 36 for balancing purposes. As shown in FIGS. 5 and 10, the tool slide assembly 34 is provided, on what may be termed the upper end thereof, with a wiper means 37 which is secured thereto by means of a plurality of screws 38. The tool slide assembly 34 is provided with a similar wiper means 39 on the lower end thereof which is secured thereto by a plurality of screws 40.

As best seen in FIG. 5, the tool slide assembly 34 is provided with an axial outwardly extended boss or hollow portion 45 which is provided with a bore 46 in which is operatively mounted a tool supporting bar 47. The bar 47 is secured in place in the bore 46 by any suitable means and carries a cutting tool 48 on the outer end thereof.

The tool slide assembly 34 is adapted to be normally biased to the zero position, as shown in FIG. 5, by the following described preload spring mechanism. As shown in FIGS. 5 and 6, the housing 15 is provided with a spring chamber 50 which is disposed on the center line of the boring head 10 and in a position parallel to the path of movement of the tool slide assembly 34. Slidably mounted in the spring chamber 50 is a tubular piston 51 which is open on the outer end thereof and in which is received the inner end of a preload spring 52. The outer end of the preload spring 52 is seated on the inner surface of a spring chamber closure cap 53 which is secured in place in the outer end of the spring chamber 50 by any suitable means, as by the screws 54. As shown in FIG. 5, a guide pin 56 is threadably mounted in a transverse threaded hole 55 formed in the inner end of the piston 51. The outer end of the guide pin 56 is rounded and extends into a bore 57 formed in the inner surface of the tool slide assembly 34. The guide pin 56 also extends through the elongated guide slot 58 which limits the downward travel of the tool slide assembly 34, as viewed in FIG. 5. The guide slot 58 also is shown in FIG. 10.

The boring head 10 is provided with the following described lubrication system. As shown in FIG. 10, the housing 15 is provided with an opening 61, in the inner end of which is operatively mounted a suitable lubrication fitting 62 that communicates with a transverse bore 63. The bore 63 communicates with a pair of laterally spaced, axially disposed bores 65 and 66 which convey lubrication to the engaging faces of the tool slide assembly 34 and the retaining guide members 23 and 24. As shown in FIG. 6, the bores or passages 65 and 66 are extended through the overlapping portions of the tool slide assembly 34 and the retaining guide members 23 and 24. As shown in FIG. 5, the transverse lubrication bore or passage 63 also communicates with the radial bore 64 which in turn communicates with the longitudinal groove 67 for conveying lubrication to the circular grooves 68 and 69 which are formed in longitudinally spaced apart positions in the inner surface of the axial bore 71 in which is slidably mounted the draw bar 70.

As shown in FIGS. 5 and 9, the tool slide assembly 34 is adapted to be counter-balanced by a counterweight assembly, generally indicated by the numeral 73. A cam and bell-crank lever means, generally indicated by the numeral 72, is adapted to simultaneously move the tool slide assembly 34 and the counterweight assembly 73 in opposite diametrical directions. The counterweight assembly 73 is slidably mounted in an elongated chamber 76 which is disposed in a position parallel to the tool slide assembly recess 19. As best seen in FIG. 9, the counterweight assembly 73 includes a U-shaped weight having a pair of laterally spaced apart legs 77 and 78 which are disposed on opposite sides of the draw bar 70. The numeral 79 indicates the upper end of the weight leg 77 and the numeral 80 indicates the upper end of the weight leg 78.

Figure 7:
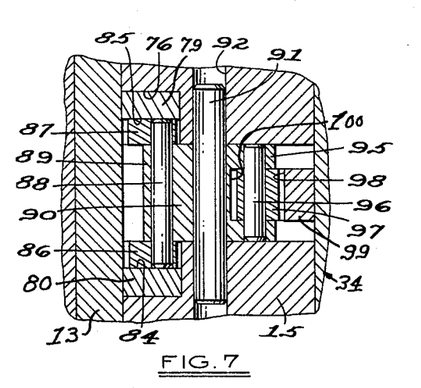
FIG. 7 is a fragmentary, horizontal section view of the structure illustrated in FIG. 5, taken along the line 7—7 thereof, and looking in the direction of the arrows.

As shown in FIGS. 7 and 9, the weight legs 77 and 78 are each provided with a cam slot, as 84 and 85, respectively, on the upper ends thereof and on the inside edge. A pair of shoes or cams 86 and 87 are slidably mounted in the cam slots 84 and 85, respectively, and they are adapted to rotatably support the ends of a shaft 88 which is carried in the arm 89 of the bell-crank lever 90.

As shown in FIGS. 5, 7 and 9, the bell-crank lever 90 is pivoted on the fulcrum shaft 91 which is operatively mounted in the bore 92 by any suitable means, as by a press fit in the bore 92. The bell-crank lever 90 is pivotally connected to the tool slide assembly 34 by the following described structure. As best seen in FIG. 7, the bell-crank lever arm 95 is milled out to provide a slot 100 which receives the inwardly extended tang 99 that is fixed to the inner surface of the tool slide assembly 34. A shaft 96 is operatively mounted between the ears formed on opposite sides of the milled slot 100 and is pivotally connected at the center portion thereof to the shoe or cam 97 which is slidably mounted in the inwardly facing, longitudinally disposed cam slot 98 formed in the inner side of the tang 99.

Figure 8:
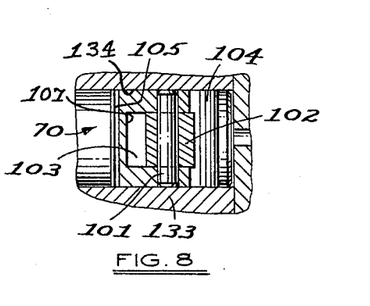
FIG. 8 is a fragmentary, horizontal section view of the structure illustrated in FIG. 5, taken along the line 8—8 thereof, and looking in the direction of the arrows.

The bell-crank lever 90 is operatively connected to the draw bar 70 by the pivot shaft 101, as shown in FIGS. 5 and 8. The bell-crank arm 106 is milled out to provide the slot 107 in which is slidably mounted a shoe or cam 102. The shaft 101 pivotally connects the shoe 102 to the spaced apart ears formed on opposite sides of the milled out slot 107. The shoe 102 is slidably mounted for movement transverse to the longitudinal axis of the draw bar 70 in the cam slot 103 formed in the inner end of the draw bar 70. As shown in FIGS. 5 and 8, the draw bar 70 is provided with the cut-out portions 104 and 105 on opposite ends of the cam slot 103 to provide clearance for the bell-crank lever 90 when it pivots about the shaft 101, as described more fully hereinafter.

The last described bell-crank lever and cam structure is provided with a lubrication system which is adapted to be filled with any suitable lubrication through a conventional lubrication fitting 110 mounted in the opening 109, as shown in FIG. 9. The lubrication fitting 110 communicates with the inwardly extended bore 111 which in turn communicates with the groove 112 formed in the side face of the bell-crank lever 90. Lubrication groove 112 communicates with theg rooves 113 and 114 for conveying lubrication to the shafts 91 and 88, respectively. A bore 115 is formed in the bell-crank lever 90 and communicates with the groove 112 and the bore 116 for conveying lubrication to the shaft 96.

As shown in FIGS. 5 and 9, the counterweight assembly 73 includes the integral transverse member 120 which connects the lower ends of the weight legs 77 and 78. As shown in FIGS. 6 and 9, a pair of laterally spaced apart circular holes 121 and 122 are formed in the housing 15 on opposite sides of the center line of the counterweight assembly 73. A pair of compensating weights 123 and 124 are adapted to be mounted in the holes 121 and 122, respectively, and to be secured to the portion 120 of the U-shaped weight member by means of the screws 125 and 126. The compensating weights 123 and 124 are adapted to compensate for the weight of the boring bar 47 and tool 48. The holes 121 and 122 communicate with the entrance opening 127 which is enclosed by the cap 128 that is secured in place by any suitable means, as by the screw 129. As shown in FIGS. 5 and 9, the inner end of the draw bar 70 is slidably supported in the inwardly extended boss 133 which is slotted on the one side thereof, as indicated by the numeral 134, to receive an arm 106 of the bell-crank lever 90.

FIG. 1 shows a spindle housing 137 which is adapted to rotatably support the rear end of the front spindle shaft 14 by suitable bearing means. The front spindle shaft 14 is rotatably mounted in the front end of the spindle housing 137 and is operatively connected by a suitable coupling means 139 to a second or rear spindle shaft 138 that is rotatably mounted in the rear end of the spindle housing 137 by suitable bearing means. The coupling 139 may be of any suitable construction. As illustrated, coupling 139 comprises the following structure. The rear precision spindle 138 is provided with the reduced end 141 on the front end thereof in which is provided a suitable recess for the reception of the reduced rear end 142 of the draw bar 70. It will be understood that the draw bar 70 is slidable axially in the front precisionspindle 14. The spindle end 141 and the draw bar end 142 are connected by any suitable means, as by the key 143.

As generally indicated by the numeral 140 in FIG. 1, a suitable means, such as a hub, is operatively mounted on the outer rear precision spindle 138 to connect the spindle 138 to a suitable drive means for rotating the spindles 138 and 14. It will be understood that the rear precision spindle 138 is movable axially to move the draw bar 70 forwardly and backwardly, as more fully described hereinafter. The spindle 138 is adapted to reciprocate in the drive hub 140 during rotation of the hub 140.

Figure 2:
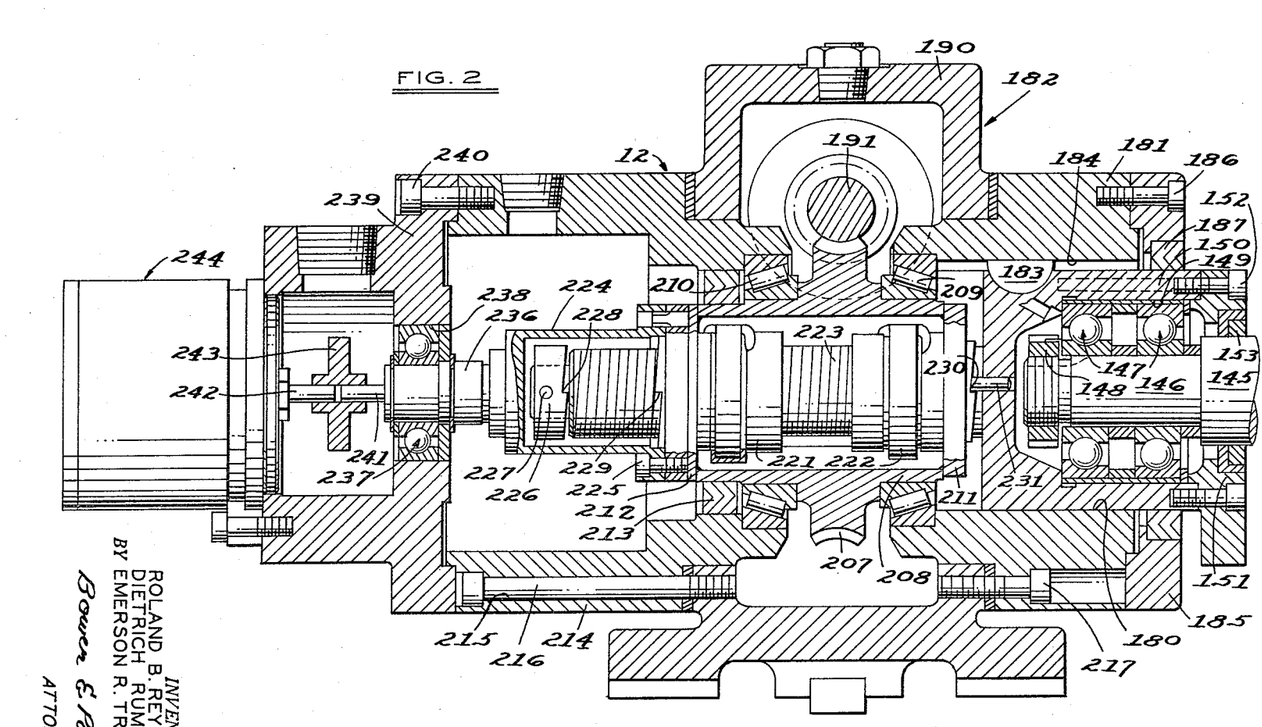
FIG. 2 is a fragmentary, enlarged, elevational section view of the structure illustrated in FIG. 1, taken along the line 2—2 thereof, and looking in the direction of the arrows.

As shown in FIG. 1, the precision sprindle 138 is operatively connected to the drive shaft 145 of the positioning drive means 12 by any suitable means, as by a suitable anti-backlash coupling generally indicated by the numeral 144. As shown in FIG. 2, the shaft 145 is provided with a reduced end 146 that is operatively secured to the inner races of a pair of ball bearing means 147 by a lock nut 148 to permit endwise movement of the shaft 145 while it is rotating. The outer races of the bearings 147 are suitably mounted in the chamber 149 formed in the outer side of the movably mounted slide 150. The bearings 147 are retained in the chamber 149 by a bearing retaining ring 151 which is fixed to the slide 150 by the screws 152. A suitable sealing ring means 153 is carried by the bearing ring 151 in a position to engage the periphery of the shaft 145.

Figure 4:
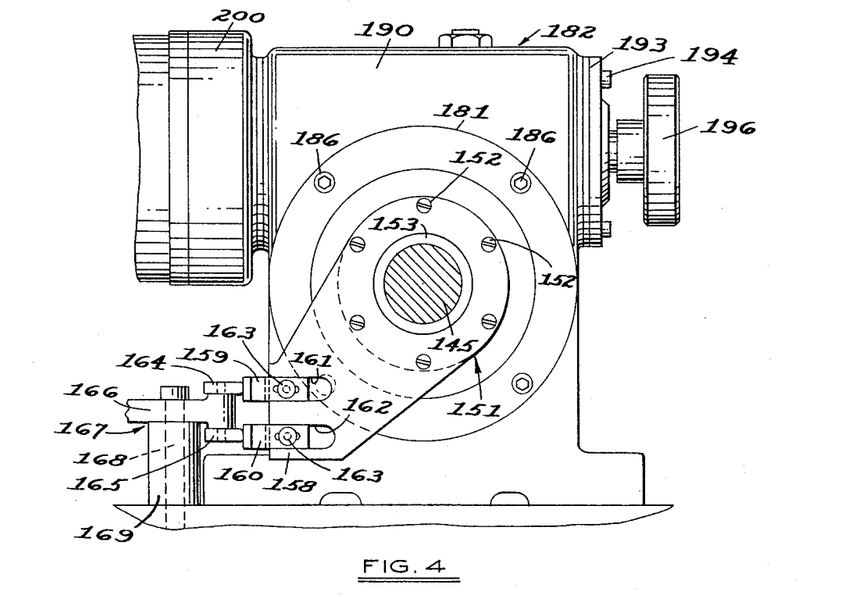
FIG. 4 is a fragmentary, enlarged, elevational section view of the structure illustrated in FIG. 1, taken along the line 4—4 thereof, and looking in the direction of the arrows.

As best seen in FIGS. 1 and 4, the retainer ring 151 has integrally formed on the lower side thereof a sidewardly outward extended switch carrier arm 158 which carries a pair of vertically spaced apart switch operator dogs 159 and 160 slidably mounted in the slots 161 and 162, respectively. The dogs 159 and 160 are secured in place by any suitable means, as by the screws 163. The dogs 159 and 160 are adapted to engage the switch roller members 164 and 165 which are mounted on the inner end 166 of the switch operating lever 167. The lever 167 is pivotally mounted by means of the screw 168 on the post 169.

As shown in FIG. 1, the outer end 173 of the switch lever 167 is provided with a pair of nuts 174 and 175 for alternately operating the switches 176 and 177. It will be understood that the switches 176 and 177 are interconnected in the control circuit for the positioning power drive means 12 to limit the longitudinal stroke of the draw bar 70 to prevent over travel of the draw bar 70.

As will be understood from FIG. 2, the draw bar slide 150 is circular in outer configuration and is slidably mounted in the bore or chamber 180 formed in the outer end of the end portion 181 of the positioning drive means housing 182. The slide 150 is prevented from rotating by means of the key 183 which is carried in the slide 150 and adapted to slide in the axially disposed key slot 184. The outer end of the bore 180 is enclosed by the closure ring 185 which is secured to the housing portion 181 by screws 186. A suitable sealing ring means 187 is carried by the end ring 185 and engages the outer surface of the slide 150.

Figure 3:
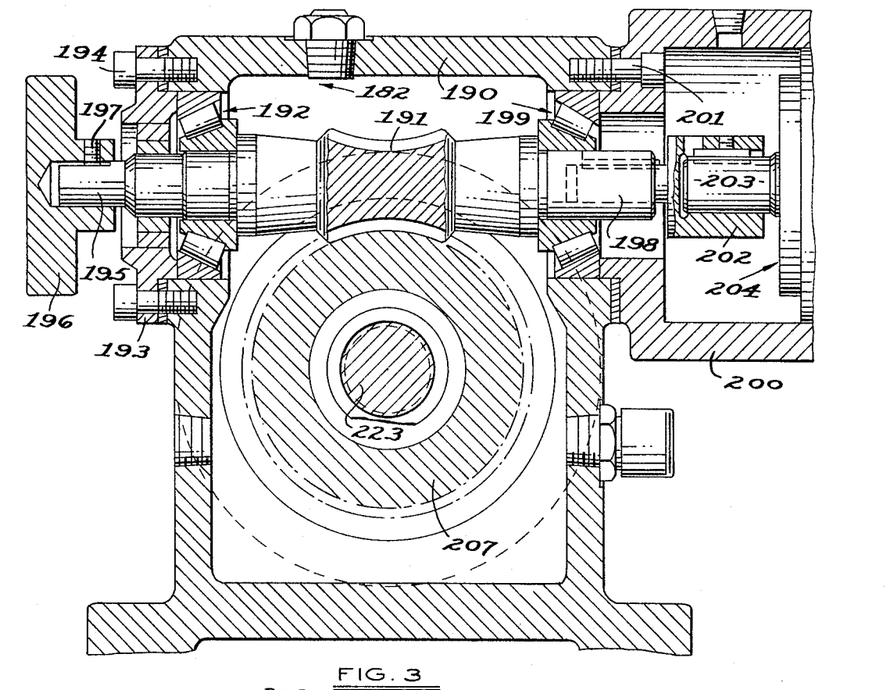
FIG. 3 is a fragmentary, enlarged, elevational section view of the structure illustrated in FIG. 1, taken along the line 3—3 thereof, and looking in the direction of the arrows.

The central portion 190 of the housing 182 supports the power drive means for moving the draw bar 70 axially. As best seen in FIG. 3, a worm drive gear 191 is carried on a shaft which has one end rotatably supported by the bearing 192 mounted in a suitable aperture in the sidewall of the housing 190. The bearing 192 is retained in place by the bearing retainer cap 193 which is fixed to the housing portion 190 by screws 194. The worm gear shaft extends through the bearing retainer cap 193 and is reduced in size as indicated by the numeral 195. The reduced shaft end 195 has fixed thereon the handwheel or knob 196 by means of the set screw 197. The operator may manually position the draw bar 70 by rotating the handwheel 196 in the appropriate direction.

The other end 198 of the shaft carrying the worm gear 191 is suitably supported in the bearing 199 carried in a suitable aperture in the other sidewall of the housing portion 190. The bearing 199 is retained in place by the end portion of a retainer housing 200 which is secured to the housing portion 190 by screws 201. As shown in FIG. 3, the worm shaft end 198 is operatively connected, by a suitable coupling 202, to the output shaft 203 of a hydraulic motor 204 mounted on the housing 200.

As shown in FIG. 1, the hydraulic motor 204 is provided with a suitable tachometer 205 to indicate the amount of rotation of the hydraulic motor 204. A conventional servo valve 206 is operatively connected to the hydraulic motor 204 to stop and start the motor in accordance with the information received from the machine control means, as for example, a tape control means.

The worm gear 191 is drivingly engaged with the worm wheel 207 which is rotatably mounted in the central housing portion 190 by means of the bearings 209 and 210, as shown in FIG. 2. The worm wheel 207 is integrally formed on a tubular shaft 208 which is supported by the inner races of the thrust bearings 209 and 210. A plate 211 is fixedly connected to the front end of the tubular shaft 208 by any suitable means as by welding. A spacer plate 212 is fixed similarly to the rear end of the tubular shaft 208. The bearing 209 is carried on the inner end of the housing portion 181. The bearing 210 is carried on the inner end of the housing portion 214 which is secured to the central housing portion 190 by the bolts 216 which are mounted in the bores 215. A suitable sealing ring means 213 is carried in the inner end of the housing portion 214 around the rear end of the tubular shaft 208. The housing portion 181 is connected to the central housing portion 190 by bolts 217.

As shown in FIG. 2, the rotary motion of the worm wheel 207 is converted to axial linear motion to move the draw bar 70 by the following structure. A first nut 221 is fixed to the plate 212 by suitable means and a second spaced apart nut 222 is fixed to the plate 211. Threadably mounted through the nuts 221 and 222 is a drive screw 223 which is fixed to the slide 150 and moved axially when the nuts 221 and 222 are rotated by the worm wheel 207. The rear end of the screw 223 extends into the housing portion 214 and into the inner tubular housing 224 which is fixed to the rear end of the tubular shaft 208 by any suitable means, as by the screws 225, so that the housing 224 will rotate with the tubular shaft 208. A dog 226 is fixed on the rear end of the screw 223 by the pin 227 and has a stop member 228 for engagement with the stop member 229 which is fixed to the shaft 208 to limit the axial movement of the screw 223 to the right, as viewed in FIG. 2. A stop 230 is operatively mounted on the front end of the plate 211 and is engaged by the dowel pin 231 on the slide 150, to limit axial movement of the screw 223 to the left, as viewed in FIG. 2.

As shown in FIG. 2, the housing 224 is provided with a reduced end shaft 236 which is rotatably mounted in a suitable bearing 237 seated in the bore 238 in the front wall of the end housing portion 239. Housing portion 239 is secured to housing portion 214 by screws 240. The shaft end 236 is provided with a further reduced end or spindle shaft 241 which is connected by a suitable coupling 243 to the drive shaft 242 of a suitable mechanical-electrical transducer 244. The transducer 244 converts the rotary motion of the drive means to an electrical signal which is employed in the electrical control circuit (not shown) of the machine.

The center of gravity of the boring head housing 15, and all of the parts rigidly attached thereto, is so adjusted as to be exactly on the spindle center line 245 (FIG. 5) so that the boring head is dynamically balanced. The numeral 246 in FIG. 5 indicates the center line of the tool slide assembly 34 when it is in the zero position. The center of gravity of the tool slide assembly 34 is indicated by the numeral 247 for the zero position. The numeral 248 indicates the center of gravity of the counterweight assembly 73 for the zero position shown in FIG. 5. The center of gravity 247 of the tool slide assembly 34 is so disposed that it never crosses the center line 245 of the spindle 70. For example, in one embodiment of the invention the working stroke of the tool 48 was .500". The center of gravity 247 of the tool slide 34 was initially disposed as shown in FIG. 5 a distance of .0625" radially outward from the slide center line 246. The center of gravity 248 of the counterweight assembly 73 was positioned on the opposite side of the spindle center line 245 a distance equal to the distance of the position of the slide center of gravity 247 away from the spindle center line 245. Under the aforementioned conditions, the tool slide assembly 34 is dynamically balanced at an operating speed of approximately 3,000 r.p.m. over the half-inch working stroke of the tool 48.

In operation, it will be seen that spring 52 normally maintains a preload on the tool slide assembly 34 and counterweight assembly 73 in the zero position shown in FIG. 5 to eliminate backlash from the tool slide positioning means when the spindle is not rotating. The tool 48 is initially set at the largest diameter to be bored or to be cut during a machining sequence. FIG. 1 shows the tool 48 in dotted line position for cutting the largest diameter. In this position the draw bar 70 would be moved to the left from the position shown in FIG. 5 and the drive screw 223 would be moved to the retracted position shown in FIG. 2. The tool 48 may be shifted radially inwardly from the dotted line position shown in FIG. 1 to the solid line position in order to machine bores of smaller diameter while the spindle is rotating. The servo valve 206 is controlled in response to prerecorded signals on a tape control or the like, for intermittently rotating the screw 223 so as to adjust the axial position of the draw bar 70 and in turn change the position of the tool 48.

As viewed in FIG. 5, it will be seen that when the draw bar 70 is moved to the left, the bell-crank lever 90 will pivot clockwise about the fulcrum shaft 91 to move the tool slide tang 99 and the tool slide assembly 34 downwardly. Simultaneously, the counterweight assembly 73 is moved upwardly an equal distance to maintain the dynamic balance of the boring head 12 during a machining operation. The stroke of the tool slide assembly 34 is limited by the length of the slot 51. It will be seen that as the draw bar 70 move to the left, as shown in FIG. 5, clearance is provided for the tang 99 to move downwardly to clear the end of the draw bar 70.

Figure 11:
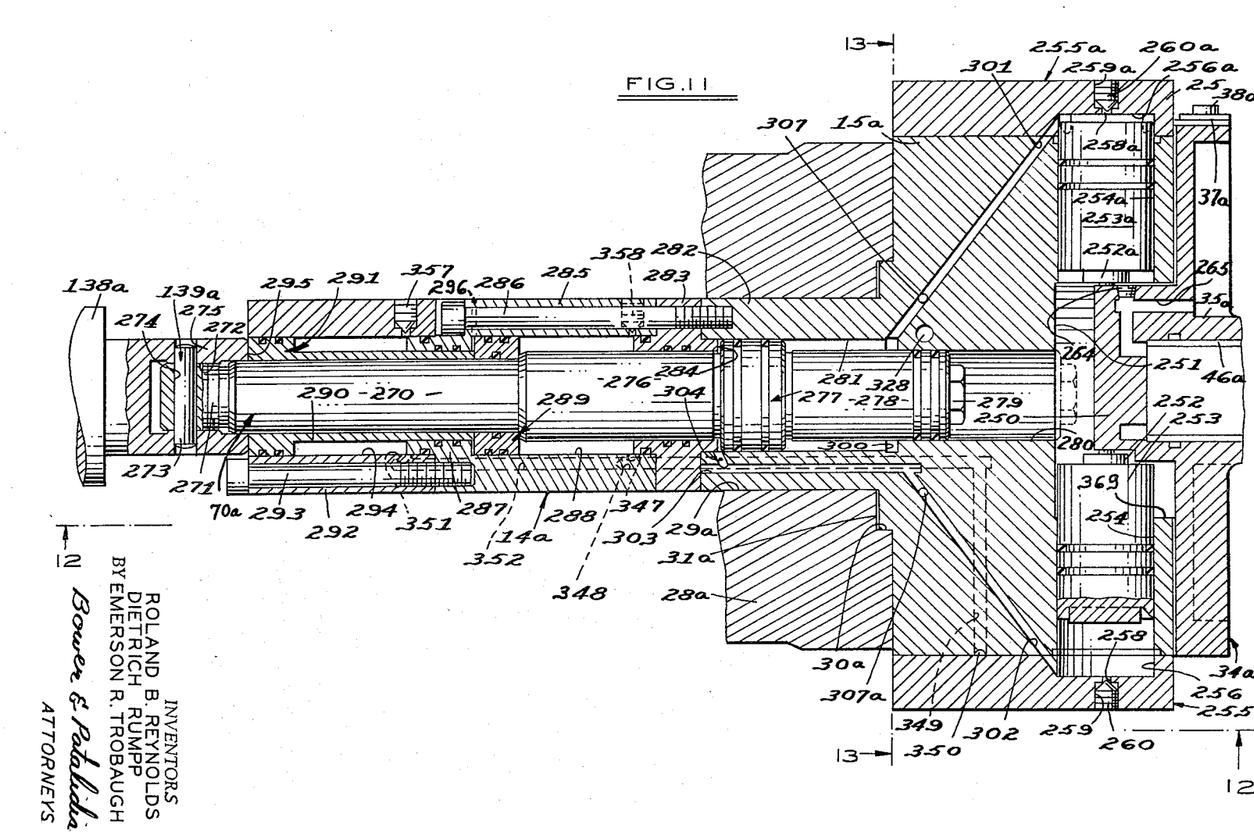
FIG. 11 is a longitudinal section view of a second embodiment of the invention, taken along the line 11—11 of FIG. 13, and looking in the direction of the arrows.

FIGS. 11 through 16 illustrate a second embodiment of the invention wherein the tool slide assembly and the counterweight assembly are each hydraulically actuated by the draw bar. The parts of the second embodiment which are the same as the parts of the first embodiment are marked with the same reference numerals followed by the small letter "a." As shown in FIG. 11, the tool slide assembly 34a is adapted to be slidably mounted on the face of the boring head housing 15a and moved in a diametrical direction across the face of this housing. The tool slide assembly 34a is provided with the axially disposed, inwardly extended tang 250 which is seated in the chamber 251 formed in the housing 15a. The tang 250 is adapted to be moved by the oppositely disposed pistons 253 and 253a which are provided with the buttons 252 and 252a, respectively, for engagement with the tang 250. As shown in FIG. 11, the piston 253 is slidably mounted in the cylinder 254 for inward and outward radial movement relative to the axis of the draw bar 70a. The cylinder 254 is enclosed by the cylinder head cap 255 which is secured in place by any suitable means, as by the screws 257. The outer end of the cylinder 254 is located in the head cap 255 as indicated by the numeral 256. As shown in FIG. 11, the cylinder 254a has mounted therein in a similar fashion the piston 253a.

The cylinder portion 256 communicates with the passage 258 and the threaded hole 259 in which is threadably mounted a cone point set screw 260 for bleeding air from the cylinder 254. The cylinder 254a is provided with a similar bleed screw 260a, as shown in FIG. 11. As shown in FIG. 11, the chamber 251 is vented to the atmosphere by means of the vent passages 264 and 265.

As shown in FIG. 11, the draw bar 70a of the second embodiment is constructed in the form of a number of hydraulic pistons and cylinders which are adapted to move the tool slide pistons 253 and 253a and a plurality of hereinafter described counterweight pistons to accomplish the same function as the draw bar 70 of the first embodiment. The draw bar 70a includes the outer end portion 270 which extends into the axial bore 272 formed in the front end of the reduced outer end portion of the machine spindle 138a. The draw bar outer end portion 271 is fixed to the spindle 138a by the key 273 which is seated in key hole 274 that passes through the end 271 of the draw bar and the end 275 of the spindle 138a.

It will be understood that the spindle 138a is adapted to be connected to the shaft 145 of the positioning power drive means described hereinbefore for the first embodiment, for moving the draw bar 70a axially forwardly and rearwardly. Integrally formed on the inner end of the draw bar portion 270 is an enlarged, intermediate portion 276. A first piston 277 is secured to the front end of the draw bar portion 276 by means of the draw bar front end portion 278 and the bolt 279. The draw bar front end portion 278 is provided with a suitable sealing means and is slidably mounted in the bore 280 formed axially in the housing 15a.

As shown in FIG. 11, the front shaft or spindle 14a actuates a number of aligned hydraulic cylinders which have slidably mounted therein a plurality of pistons carried by the draw bar 70a. A first or inner cylinder 281 is formed in the shaft portion 282 which is integrally formed with the housing 15a.

The outer end of the cylinder 281 is enclosed by the cylinder end wall 283 which forms a second cylinder 284 in the space between it and the first piston 277. A third cylinder 288 is formed in the intermediate portion 285 of the spindle 14a in the space surrounding the draw bar portion 276 and it is enclosed by the cylinder end wall 283 and the piston 289. The spindle intermediate portion 285 is adapted to be secured to the cylinder end wall 283 and the inner spindle portion 282 by a plurality of bolts 286. The spindle intermediate portion 285 has integrally formed on the outer end thereof the cylinder end wall 287. A sleeve 290 is carried on the draw bar portion 270 and has formed on the outer end thereof the cylinder end wall 291 to enclose the fourth cylinder 294 formed between the sleeve 290 and the outer end portion 292 of the spindle 14a. The spindle portion 292 is fixed to the spindle portion 285 by a number of bolts 293. The spindle end portion 292 abuts the front end 295 of the spindle 138a as shown in FIG. 11. The chamber between the piston 289 and the inner side of the cylinder end wall 287 is vented to the atmosphere by the passage 296.

As shown in FIG. 11, the first or slide assembly piston 277 is adapted to force oil from the slide front and rear cylinders 281 and 284 alternately into the cylinder 254a and 254, respectively. An enlarged angular groove 300 is formed at the inner end of the slide front cylinder 281 and communicates with the passage 301 formed in the housing 15a for conveying fluid under pressure from the cylinder 281 into the outer end 256a of the cylinder 254a behind the piston 253a. The outer end 256 of the other piston cylinder 254 is connected by means of the passages 302, 303 and 304 to the outer end of the second or slide rear cylinder 284. It will be seen that the last described hydraulic circuit for operating the tool slide assembly pistons 253 and 253a is a closed hydraulic circuit.

Figure 13:
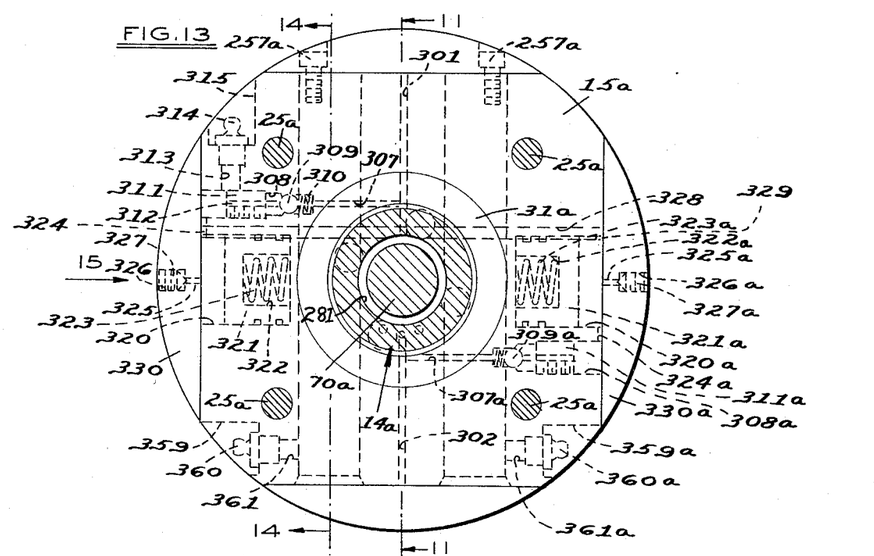
FIG. 13 is an elevational section view of the structure illustrated in FIG. 11, taken along the line 13—13 thereof, and looking in the direction of the arrows.

As shown in FIG. 13, the housing 15a has a hydraulic fluid reservoir 320 formed in one side thereof in which is slidably mounted a piston 321. The reservoir 320 is connected to the passage 301 by means of the passage 307, the bore 308 and the passage 324. A one-way ball check valve seat 311 is threadably mounted in the bore 308 and is provided with a passage 312 therethrough which is normally closed by the ball check valve 309. A spring 310 normally biases the ball check valve 309 into seating engagement with the valve seat 311. The housing 15a is provided with an opening 315 in which is operatively mounted a suitable leak proof hydraulic fitting to permit adding of hydraulic fluid into the reservoir 320. The fitting 314 communicates with the bore 313 which in turn communicates at the other end thereof with the bore 308. A predetermined pressure is maintained in the closed circuit comprising the passages 307, 301, cylinder 254a and the cylinder 281, by means of the spring 323 which is mounted in the spring chamber 322 formed on the inner side of the piston 321. It will be seen that the spring 323 normally biases the piston 321 radially outward to maintain a pressure on the fluid in the reservoir 320 which has been communicated into the hydraulic circuit operating on the piston 253a.

Figure 15:
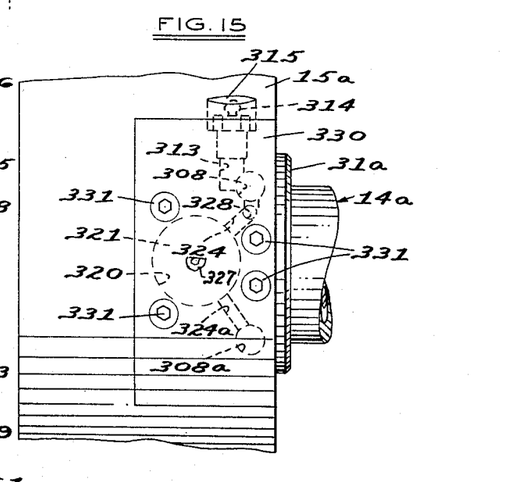
FIG. 15 is a fragmentary, left side elevation view of the structure illustrated in FIG. 13, taken in the direction of the arrow marked "15"

As shown in FIGS. 13 and 15, the outer ends of the reservoir 320, the bore 308 and the passage 324 are enclosed by the end cap 330 which is detachably secured to the housing 15a by any suitable means, as by the screws 331. The reservoir 320 is provided with means for bleeding air therefrom which comprises the bleed passage 325 formed through the cap 330, and the threaded hole 326 in which is threadably mounted the cone point set screw 327.

Figure 12:
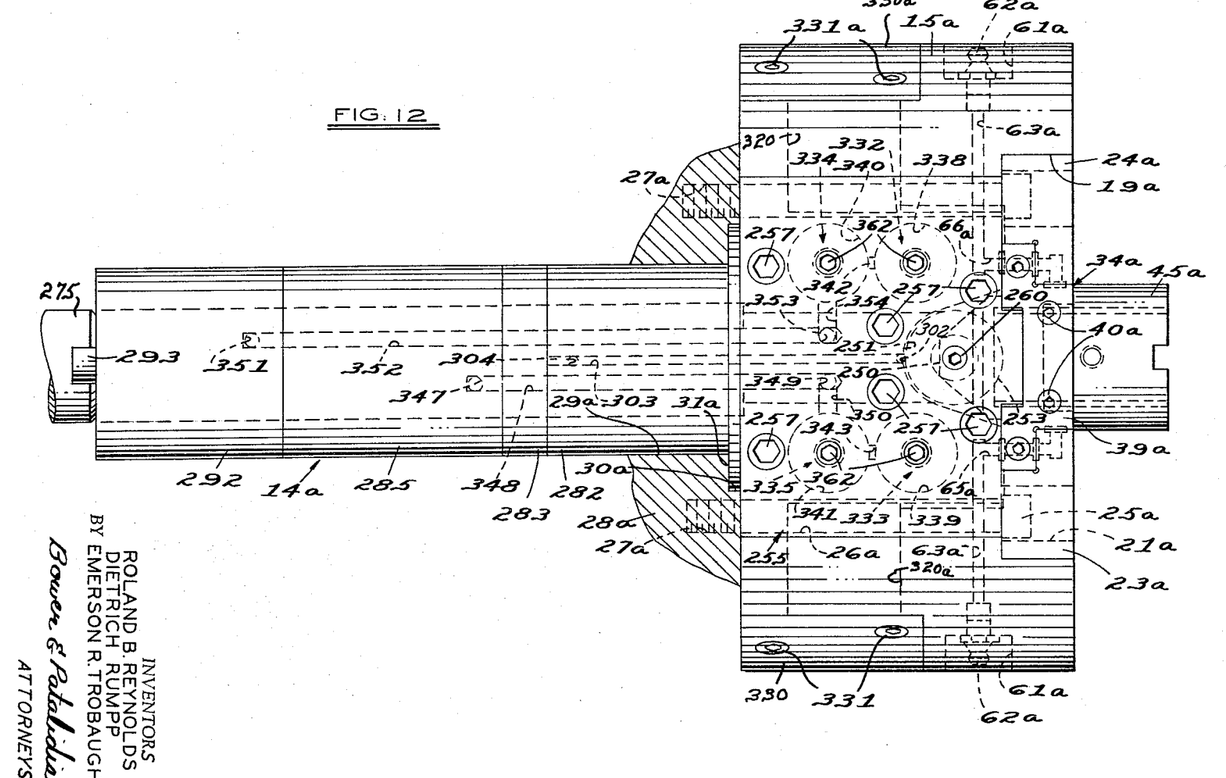
FIG. 12 is a bottom plan view of the structure illustrated in FIG. 11, taken along the line 12—12 thereof, and looking in the direction of the arrows.
Figure 14:
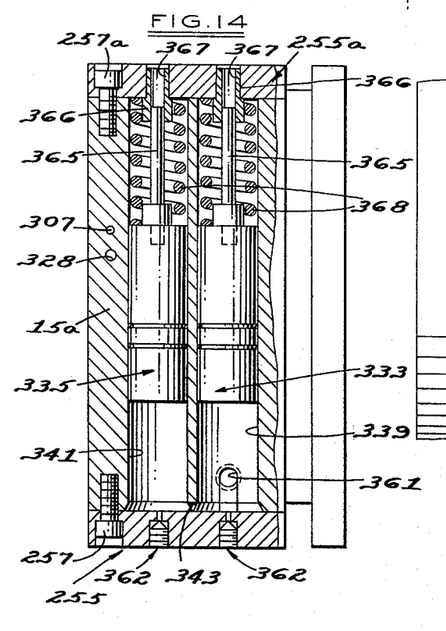
FIG. 14 is a fragmentary, elevational section view of the structure illustrated in FIG. 13, taken along the line 14—14 thereof, and looking in the direction of the arrows.

As shown in FIG. 13, the fluid circuit for operating the other slide piston 253 is also provided with a similar fluid reservoir structure, and the same parts have been marked with the same reference numerals followed by the small letter "a." The fluid reservoirs 320 and 320a are connected by means of the transverse passage 328, the passage 329 and the passage 324. As shown in FIG. 12, a counterweight assembly includes a plurality of pistons 332, 333, 334 and 335 which are slidably mounted in the cylinders 338, 339, 340 and 341, respectively. The piston cylinders 338 and 340 are disposed on one side of the center line of the axis of the spindle 14a, and the piston cylinders 339 and 341 are disposed on the opposite side of the longitudinal axis of the spindle 14a. Each pair of cylinders on each side of the center line axis of the spindle 14a is disposed parallel to the longitudinal axis of the spindle 14a equidistant outwardly therefrom. As shown in FIG. 14, the counterweight pistons are provided with suitable O-ring sealing means.

As shown in FIG. 12, the piston cylinders 338 and 340 are connected at the lower ends thereof by means of the passage 342. As shown in FIG. 14, the lower ends of the cylinders 339 and 341 are also connected at the lower ends thereof by the passage 343.

The counterweight cylinders 339 and 341 are supplied with fluid under pressure from the cylinder 288 by a passageway system which comprises the interconnected passages 347, 348, 350 and the bore 349. As shown in FIG. 12, the passage 350 communicates with the cylinder 341 and the fluid then passes through the passage 343 into the cylinder 339. The other set of cylinders 338 and 340 are supplied with fluid under pressure from the cylinder 294 by a passageway system comprising the interconnecting passages 352 and 354, and the bores 351 and 353. The fluid passes into the cylinder 340 from the passage 354 and thence through the passage 342 into the cylinder 338.

As shown in FIG. 11, the counterweight fluid supply cylinders 294 and 288 are provided with the cone point set screws 357 and 358 for bleeding air from these cylinders in the same manner as described hereinbefore for the use of the bleed screw 260. The last two described circuits for conveying fluid under pressure into the counterweight piston cylinders may be termed "open circuits" and each of these circuits may be replenished with hydraulic fluid by means of the filler fittings 360 and 360a, as shown in FIG. 13. The filler fittings 360 and 360a are mounted in the openings 359 and 359a, respectively, formed in the housing 15a and communicate with the cylinders 339 and 338, respectively, for filling the counterweight fluid circuits. As shown in FIG. 14, the counterweight cylinders 339 and 341 are provided with suitable bleed screws 362 which function in the same manner as the previously described bleed screw 360 for bleeding air from the cylinders.

As illustrated in FIG. 14, the counterweight pistons 333 and 335 are normally biased in one direction by compression springs 368 which are mounted in the cylinders 339 and 340 on the ends opposite to which the fluid under pressure is admitted. The draw bar 70a operates to force hydraulic fluid into one end of each of the counterweight cylinders against the pressure of the compression springs 368, and when the draw bar is moved to the left as view in FIG. 11, the compression springs 368 function to force the hydraulic fluid back into the respective cylinders in the spindle 14a. Each of the counterweight cylinders is provided with a compression spring as 368 which provides a preload on the counterweight pistons in one direction and the control pistons on the draw bar 70a force hydraulic fluid into the counterweight cylinders against the other ends of the counterweight pistons.

As shown in FIG. 14, each of the counterweights is provided with a rod 365 which is fixed to its respective counterweight piston. The rods 365 are calibrated and function as gage rods. The outer ends of the gage rods 365 are slidably mounted in the bores 367 formed in the guide sleeves 366 which are mounted in suitable apertures formed in the cylinder end cap 255a. The gage rods 365 are graduated to show the position of the counterweight pistons in their respective cylinders. If the boring bar 47 is a light boring bar then the gage rods would not extend out through the bores 67 as much as they would for a heavier boring bar which would require more oil to be pumped into the counterweight cylinders behind the counterweight pistons.

In use, the counterweight cylinders 338, 339, 340 and 341 would be filled with hydraulic fluid sufficient to move the counterweights to a counterbalancing position in the respective cylinders to counter-balance the weight of the tool slide assembly 34a and the boring bar and tool carried thereon. The counterweight pistons 332, 333, 334 and 335 would be positioned to balance the tool slide assembly 34a in the same manner as the first described mechanical embodiment. The tool slide assembly 34a would be constructed to provide .0625" over travel in the same manner as the first embodiment for positioning and set-up purposes. The boring head shown in FIGS. 11 through 16 is adapted to be dynamically balanced at its designed operating speed. The hydraulic circuits for operating the tool slide assembly pistons 253 and 253a and the counterweight pistons must be free of air pockets and leak proof. It will be understood that the various hydraulic cylinder pistons, the counterweight pistons, and the slide assembly pistons are all provided with suitable O-ring sealing means.

In use, the tool slide assembly 34a would be in the zero position shown in FIG. 11 at the start of a machining sequence. The draw bar 70a would be in the position shown in FIG. 11 with the counterweight pistons being disposed in their respective cylinders in positions disposed toward the fluid supply end of the cylinders, as illustrated in FIG. 14. The positioning drive means employed with the embodiment of FIG. 1 may also be operatively connected to the draw bar 70a, and in accordance with a tape control means the draw bar 70a would be moved to the right as viewed in FIGS. 11 and 16. The dotted line position of the inner end of the draw bar 70a in FIG. 11 illustrates the inner end travel position of the draw bar 70a in accordance with the full working stroke of the tool slide assembly.

Figure 16:
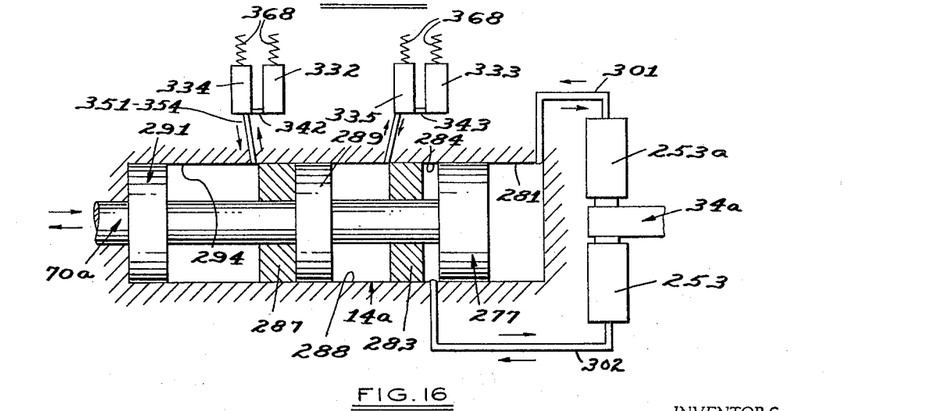
FIG. 16 is a diagrammatic view of the closed circuit hydraulic system for actuating the boring head embodiment of FIGS. 11 through 15.

As the draw bar 70a moves to the right, as viewed in FIGS. 11 and 16, fluid under pressure will be forced from the cylinder 291 through the passage 301 into the outer end of the slide piston cylinder 254a. The fluid under pressure will move the slide piston 253a radially inward to move the tang 250 downwardly as viewed in FIG. 11. The piston 253 in the cylinder 254 will force the hydraulic fluid from the outer end of the cylinder 254 and through the passage 302, the passage 303 and bore 304 and to the cylinder 284. When the draw bar 70a is moved outwardly, or to the left as viewed in FIG. 11, the flow of hydraulic fluid in the last described closed circuit will be reversed.

When the draw bar 70a moves inwardly, as previously described, the pistons 289 and 291 will force fluid through the aforedescribed open circuit counterweight systems into the counterweight cylinders to force the counterweight pistons against the compression springs 368 to maintain the dynamic balance of the tool slide assembly 34a as it is moved diametrically across the face of the housing 15a. When the draw bar 70a is moved to the left as viewed in FIGS. 11 and 16, the compression springs 368 will force the hydraulic fluid back through the closed counterweight fluid systems into the cylinders 298 and 290. The slide 34a is limited by the length of the slot 369 in the housing 15a, as shown in FIG. 11. FIG. 11 shows the draw bar 70a in the zero position to maintain pressure against the piston 253 to maintain the slide 34a in the zero position.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What we claim is:
1. In a boring head the combination comprising:
 (a) a rotatably mounted spindle;
 (b) a housing secured to said rotatable spindle;
 (c) a tool slide assembly movably mounted on said housing for adjustment perpendicular to the longitudinal axis of said spindle and having a cutting tool operatively mounted thereon;
 (d) a counterweight assembly movably mounted on said housing for adjustment perpendicular to the longitudinal axis of said spindle with the total weight of said tool slide assembly being equal to the total weight of said counterweight assembly;
 (e) adjustment means for simultaneously moving said tool slide assembly and said counterweight assembly in opposite directions perpendicular to the axis of said spindle; and,
 (f) means for actuating said adjustment means.
2. A boring head as defined in claim 1, wherein:
 (a) said adjustment means comprises a mechanical means.
3. A boring head as defined in claim 1, wherein:
 (a) said adjustment means comprises a hydraulic means.
4. A boring head as defined in claim 1, wherein:
 (a) said means for actuating said adjustment means comprises a movable draw bar means axially disposed in said spindle.
5. A boring head as defined in claim 1, wherein said means for actuating said adjustment means includes:
 (a) a movable draw bar means axially disposed in said spindle; and,
 (b) a power drive means connected to said draw bar means for moving said draw bar axially in said spindle.

6. A boring head as defined in claim 1, wherein:
(a) said counterweight assembly comprises a weight member having portions mounted for movement on opposite sides of said spindle.

7. A boring head as defined in claim 6, wherein:
(a) said counterweight assembly further includes a plurality of compensating weights detachably mounted to said weight member.

8. A boring head as defined in claim 1, wherein:
(a) said counterweight assembly includes a plurality of movably mounted, radially disposed pistons.

9. A boring head as defined in claim 1, including:
(a) means for normally biasing said slide assembly to a zero position.

10. A boring head as defined in claim 9, wherein:
(a) said means for normally biasing said slide assembly to a zero position comprises a spring biased piston connected to said slide assembly.

11. A boring head as defined in claim 10, wherein:
(a) said spring biased piston is connected to said slide assembly by a guide pin which limits the amount of travel of said slide assembly.

12. In a boring head the combination comprising:
(a) a rotatably mounted spindle;
(b) a housing secured to said rotatable spindle;
(c) a tool slide assembly movably mounted on said housing for adjustment perpendicular to the longitudinal axis of said spindle and having a cutting tool operatively mounted thereon;
(d) means for limiting the end travel positions of said tool slide assembly;
(e) a counterweight assembly movably mounted on said housing for adjustment perpendicular to the longitudinal axis of said spindle with the total weight of said tool slide assembly being equal to the total weight of said counterweight assembly;
(f) adjustment means for simultaneously moving said tool slide assembly and said counterweight assembly in opposite directions perpendicular to the axis of said spindle; and
(g) means for actuating said adjustment means.

13. In a boring head the combination comprising:
(a) a rotatably mounted hollow spindle;
(b) a housing secured to said rotatable spindle;
(c) a tool slide assembly movably mounted on said housing for adjustment perpendicular to the longitudinal axis of said spindle and having a cutting tool operatively mounted thereon;
(d) a counterweight assembly movably mounted on said housing for adjustment perpendicular to the longitudinal axis of said spindle with the total weight of said tool slide assembly being equal to the total weight of said counterweight assembly;
(e) a draw bar movably mounted in said hollow spindle and extended into said housing;
(f) a bell-crank lever operatively connected to said draw bar, tool slide assembly and counterweight assembly; and,
(g) means for actuating said draw bar to pivot said bell-crank lever to move said tool slide assembly and said counterweight assembly in opposite directions perpendicular to the axis of said spindle.

14. A boring head as defined in claim 13, wherein:
(a) said bell-crank lever is connected to said slide assembly, draw bar and counterweight assembly by cam means.

15. A boring head as defined in claim 13, wherein said means for actuating said draw bar includes:
(a) gear driven nut means;
(b) a shaft connected to said draw bar and provided with screw means operatively connected to said nut means and movable axially when said nut means is rotated; and,
(c) said shaft means being provided with stop means to limit axial movement of the same.

16. A boring head as defined in claim 13, wherein said counterweight assembly includes:
(a) a U-shaped weight and a plurality of compensating weights attached to said U-shaped weight.

17. In a boring head the combination comprising:
(a) a rotatably mounted hollow spindle;
(b) a housing secured to said rotatable spindle;
(c) a tool slide assembly movably mounted on said housing for adjustment perpendicular to the longitudinal axis of said spindle and having a cutting tool operatively mounted thereon;
(d) a counterweight assembly movably mounted on said housing for adjustment perpendicular to the longitudinal axis of said spindle with the total weight of said tool slide assembly being equal to the total weight of said counterweight assembly;
(e) a draw bar movably mounted in said hollow spindle and extended into said housing;
(f) a plurality of hydraulic cylinders;
(g) a first pair of fluid operated pistons engageable with said tool slide for moving the same and operated by fluid supplied by one of said hydraulic cylinders;
(h) said counterweight assembly includes a plurality of pistons movably mounted in said housing;
(i) spring means for biasing said counterweight pistons in one direction;
(j) at least two of said plurality of hydraulic cylinders adapted to supply fluid under pressure to move said counterweight pistons in a direction against the bias of said springs;
(k) said draw bar being adapted to actuate said hydraulic pistons; and,
(l) means for actuating said draw bar to actuate said hydraulic pistons to move said tool slide assembly and said counterweight assembly in opposite directions perpendicular to the axis of said spindle.

18. A boring head as defined in claim 17, wherein:
(a) said counterweight pistons are provided with gauge rods to indicate the positions of said pistons.

19. A boring head as defined in claim 17, including:
(a) reservoir means for supplying fluid to the hydraulic cylinders.

20. A boring head as defined in claim 17, wherein:
(a) said plurality of hydraulic cylinders are formed concentric with said draw bar.

No references cited.

WILLIAM W. DYER, Jr., *Primary Examiner.*

G. A. DOST, *Assistant Examiner.*